US008627557B2

(12) United States Patent
Jansen et al.

(10) Patent No.: US 8,627,557 B2
(45) Date of Patent: Jan. 14, 2014

(54) PIN PULLER

(75) Inventors: Kirk Kenneth Jansen, Abbotsford (CA); Patrick James Roberts, Chilliwack (CA)

(73) Assignee: Tiger Tool International Incorporated, Abbotsford (CA)

( * ) Notice: Subject to any disclaimer, the term of this patent is extended or adjusted under 35 U.S.C. 154(b) by 537 days.

(21) Appl. No.: 12/830,409

(22) Filed: Jul. 5, 2010

(65) Prior Publication Data

US 2011/0010909 A1 Jan. 20, 2011

Related U.S. Application Data

(60) Provisional application No. 61/226,652, filed on Jul. 17, 2009.

(51) Int. Cl.
*B23P 19/04* (2006.01)

(52) U.S. Cl.
USPC .................................. 29/255; 29/270; 29/278

(58) Field of Classification Search
USPC .................. 29/244, 255, 270, 278, 263, 252; 269/24–32
See application file for complete search history.

(56) References Cited

U.S. PATENT DOCUMENTS

| | | | | |
|---|---|---|---|---|
| 1,465,124 | A | 8/1923 | Gardner, Jr. | |
| 2,317,405 | A | 4/1943 | Rutten | |
| 2,596,549 | A | 5/1952 | Hamilton | |
| 3,044,157 | A | 7/1962 | Fink | |
| 3,110,958 | A | 11/1963 | McCord | |
| 3,358,352 | A | 12/1967 | Wilcox | |
| 3,654,685 | A | 4/1972 | Shiflet | |
| 4,057,889 | A | 11/1977 | Ferguson | |
| 4,249,293 | A | 2/1981 | Schulberg | |
| 4,339,865 | A | 7/1982 | Shultz | |
| 4,624,041 | A | 11/1986 | Gathright et al. | |
| 4,724,608 | A | 2/1988 | Parrott | |
| 4,934,672 | A * | 6/1990 | Craft | 269/22 |
| 4,989,442 | A | 2/1991 | Rosier | |
| 5,025,542 | A | 6/1991 | Jacks | |
| 5,033,177 | A | 7/1991 | Gathright et al. | |
| 5,042,132 | A | 8/1991 | Hardin | |
| 5,161,788 | A * | 11/1992 | Guzzoni | 269/24 |
| 5,363,543 | A | 11/1994 | Boyd et al. | |
| 5,390,403 | A | 2/1995 | Brueckert et al. | |
| 5,528,809 | A | 6/1996 | Green et al. | |
| 5,957,443 | A * | 9/1999 | Mascola | 269/22 |
| 6,389,668 | B1 | 5/2002 | Hwang | |
| 6,625,861 | B2 | 9/2003 | Whetstone et al. | |
| 6,745,447 | B2 | 6/2004 | Smith | |
| 7,036,810 | B2 * | 5/2006 | Wal, III | 269/296 |
| 7,134,268 | B2 | 11/2006 | Siappas | |
| 7,191,504 | B1 | 3/2007 | Charron | |
| 7,228,609 | B2 | 6/2007 | Smith | |
| 7,363,798 | B1 | 4/2008 | Nikkel | |
| 8,132,799 | B2 * | 3/2012 | McIntosh et al. | 269/32 |
| 2003/0222388 | A1 * | 12/2003 | Vander Wal, III | 269/296 |
| 2006/0202401 | A1 * | 9/2006 | Shinozaki | 269/27 |
| 2011/0010909 | A1 * | 1/2011 | Jansen et al. | 29/426.5 |

* cited by examiner

*Primary Examiner* — Lee D Wilson
(74) *Attorney, Agent, or Firm* — Oyen Wiggs Green & Mutala LLP

(57) ABSTRACT

A pin puller includes a coupler to connect a pull rod to an end of a pin. A follower attaches to a tail end of the pin. The coupler may comprise a pair of mating shells having features to engage the pin and pull rod. An actuator is configured to apply tension to the pull rod. The pin puller may be used to remove and install pins and associated bushings in truck suspensions and other applications.

37 Claims, 8 Drawing Sheets

PIN PULLER

REFERENCE TO RELATED APPLICATION

This application claims the benefit under 35 U.S.C. 119 of U.S. Patent Application No. 61/226,652 filed 17 Jul. 2009 and entitled PIN PULLER which is hereby incorporated herein by reference.

TECHNICAL FIELD

This invention relates to tools. Specific embodiments provide pullers for pulling pins. The invention has application, for example, in removing and installing the pins used in the suspensions of heavy trucks.

BACKGROUND

Pins embedded in bushings are used in the suspensions of some heavy trucks. For example, such pins and bushings may be provided at the ends of truck leaf springs and/or at truck chassis suspension points. Over time and with use, the bushings can deteriorate to the point that they require replacement. This is a big job. In many cases it is necessary to remove the leaf spring from the truck and to press out the bushings and pins using a heavy-duty press. This is time consuming for mechanics. Re-fitting the suspension of a truck can be expensive for a truck owner.

Various presses and pin pullers are known. Some examples of these are described in the following United States patents:

| |
|---|
| 7,363,798 |
| 6,625,861 |
| 5,390,403 |
| 4,339,865 |
| 3,654,685 |
| 3,044,157 |
| 7,191,504 |
| 6,389,668 |
| 5,363,543 |
| 4,249,293 |
| 3,110,958 |
| 5,025,542 |
| 7,134,268 |
| 4,989,442 |
| 1,465,124 |
| 7,228,609 |
| 6,745,447 |
| 5,042,132 |
| 5,528,809 |
| 5,033,177 |
| 4,724,608 |
| 4,624,041 |
| 4,057,889 |
| 3,358,352 |
| 2,596,549 |
| 2,317,405 |

There remains a need for tools and methods capable of removing and/or installing pins of the types found in the suspensions of heavy trucks. Existing tools, including those listed above, are not suitable for use in removing or installing such pins. There is a particular need for such tools and methods useful for removing and/or installing pins that are embedded in elastomer bushings.

SUMMARY

One aspect of the invention provides tools suitable for pulling on pins. In certain embodiments the tools have a coupler for coupling a pin to a pull rod and/or a follower adapted to be coupled to a trailing end of a pin being pulled.

Another aspect of the invention provides methods for pulling pins. Such methods may be applied, for example, for removing pins from truck suspension components or installing pins in the truck suspension components. In certain embodiments the pins are bonded into elastomer bushings and the pins and bushings are removed or installed together.

Various aspects of the invention provide tools for pulling pins, couplers for use in pin pullers, followers for use with pin pullers and methods for removing and installing pins.

One example aspect of the invention provides a pin puller tool. The tool comprises a pull rod; a coupler for coupling a first end of the pull rod to a first end of a pin to be pulled a puller; and a follower. The puller comprises an actuator configured to apply longitudinal pulling force on the pull rod. The follower is configured for coupling to a second end of the pin to be pulled. The follower has a face for bearing against a bushing in which the pin to be pulled is embedded.

A further aspect of the invention provides a method for installing or removing a pin and bushing. The method comprises coupling a pull rod to a first end of the pin; coupling a follower to a second end of the pin; applying tension to the pull rod to pull the pin into or out of a bore and, concurrently allowing force transmitted through the pin to the follower to push the bushing into or out of the bore.

Another aspect of the invention provides a pin puller tool comprising: a pull rod; a coupler for coupling a first end of the pull rod to a first end of a pin, and a puller comprising an actuator configured to apply longitudinal pulling force on the pull rod. The coupler may comprise first and second mating shells. The first and second shells, when mated, define opposing first and second bore ends. The first bore end comprises a first engagement feature configured to engage an end of the pull rod. The second bore end comprises a second engagement feature configured to engage the one end of the pin. A sleeve is slidably engageable over the first and second mating shells, when mated. The sleeve, when engaged over the mated first and second shells, prevents the first and second shells from becoming disengaged.

Another aspect of the invention provides a method for connecting a pull rod to a pin. The method comprises placing an end of the pull rod adjacent to a first end of the pin and arranging first and second mating shells on either side of the pin and pull rod such that the pin and pull rod respectively project into opposing first and second bore ends defined by the first and second mating shells and engagement features of the first and second mating shells engage corresponding features of the pin and pull rod. The method may further comprise sliding a sleeve over the first and second mating shells such that engagement of the sleeve over the mated first and second shells prevents disengagement of the first and second shells from the pin and pull rod.

The foregoing aspects are illustrative examples only. In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

LIST OF REFERENCES

Figure 1:
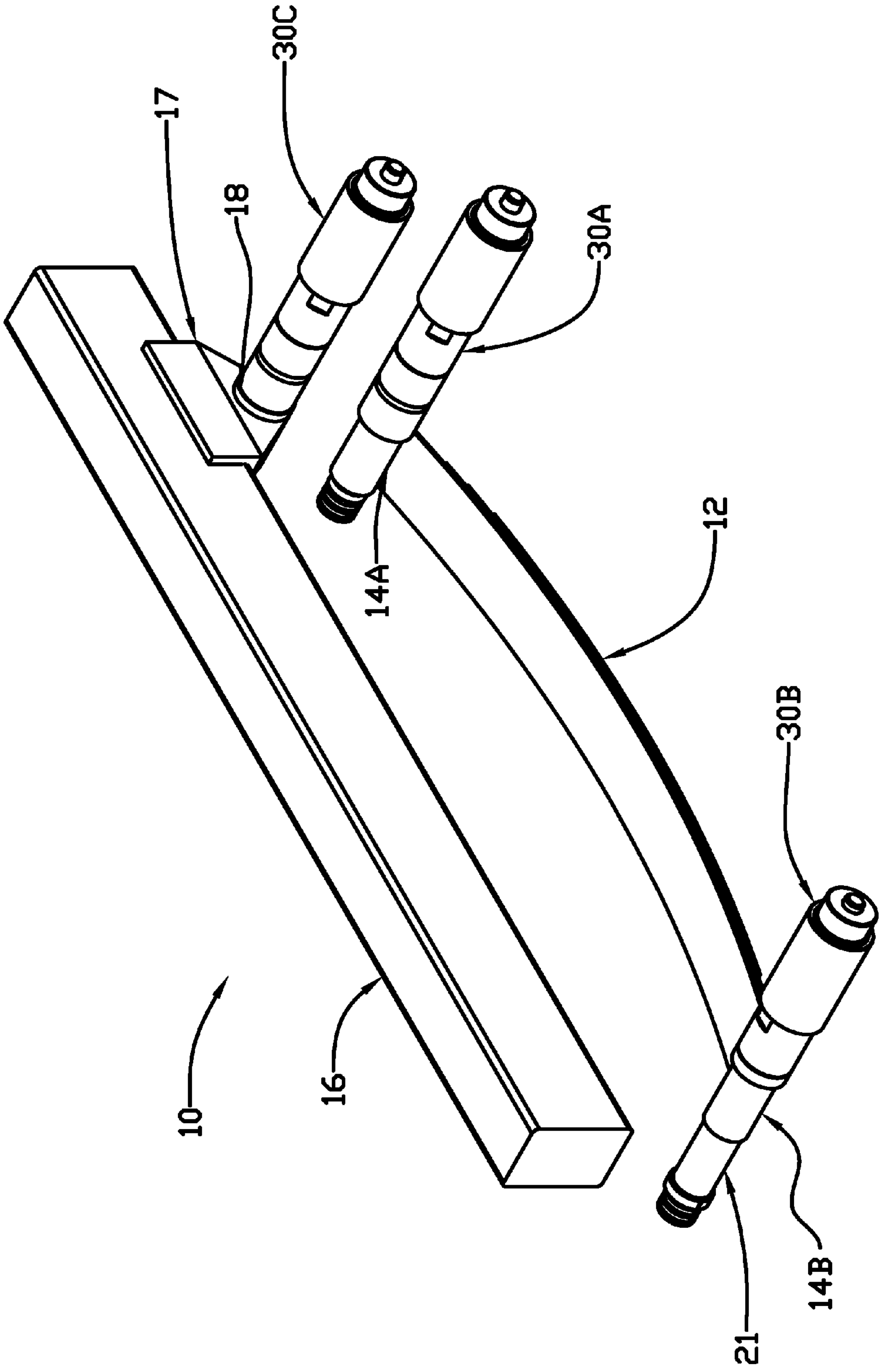
FIG. 1 is a partially schematic illustration of the suspension of a truck showing a number of pullers of the general type as described herein being used to install and remove pins and bushings at a number of different suspension points on a vehicle.

| | |
|---|---|
| Vehicle 10 | Leaf spring 12 |
| Eye of spring 14, 14A, 14B | Chassis 16 |
| Support point 17 | Bore 18 |
| Pin 20 | Pin end 20A, 20B |
| Pin groove 20C, 20D | Bushing 21 |
| Puller 30 | Puller 30A, 30B, 30C |
| Main puller component 32 | Follower 34 |
| Pull rod 36 | End of pull rod 36 A |
| Flange 38 | Coupler 40 |
| Bore end 42A | Bore end 42B |
| Groove 44 | Ridge 46 |
| Shells 48A, 48B | Retaining sleeve 50 |
| Puller assembly 52 | Spring 53 |
| Actuator 54 | Port 55 |
| Piston 56 | Cylinder 57 |
| Opening 58 | Fastener 59 |
| Abutment face 60 | Spacer 62 |
| Spacer parts 62A, 62B, 62C | Tubular member 64 |
| Bore 65 | Bore 69 |
| Follower 70 | Shells 72A, 72B |
| Bore 74 | Projections 75 |
| Retainer sleeve 76 | O-ring 77 |
| Groove 78 | Striking face 79 |
| Arrow 80 | Bore 85 |

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

FIG. 1 shows a portion of the suspension of a vehicle 10. Included in FIG. 1 is a leaf spring 12. Each end of leaf spring 12 is formed into an eye 14A, 14B (collectively eyes 14). Each of eyes 14 can accommodate a pin 20 (see FIG. 3) that is embedded in a bushing 21. Bushings 21 may comprise elastomeric bushings, for example. In the illustrated embodiment, a chassis 16 of vehicle 10 includes a support point 17 comprising a bore 18 which receives another pin 20 and bushing 21.

When the suspension is fully assembled, shackles (not shown) connect the pins 20 projecting from leaf spring 12 to corresponding pins 20 at support points on chassis 16. For reasons relating to vehicle maintenance or repair, it may be necessary to remove and replace one or more of pins 20 and the associated bushings 21.

Embodiments of the invention provide pin pullers that may be applied to remove and replace pins of the types that may be found, for example, in vehicle suspensions. Such pullers may have more general application as well.

FIG. 1 shows one puller 30A that has been installed to remove a pin 20 (not shown in FIG. 1) from a first eye 14A of leaf spring 12. Also shown in FIG. 1 is a second puller 30B configured to introduce a new pin 20 (not shown in FIG. 1) and bushing 21 into a second eye 14B of leaf spring 12. Also shown in FIG. 1 is a third puller 30C which has been coupled to remove a pin 21 from a support point 17 on vehicle chassis 16. Pullers 30A, 30B and 30C illustrate different applications of a puller of the general type described herein. Typically three pullers would not be deployed at once. Typically a mechanic would use one puller to sequentially remove and replace pins 20 and their associated bushings 21 as required.

Figure 2:
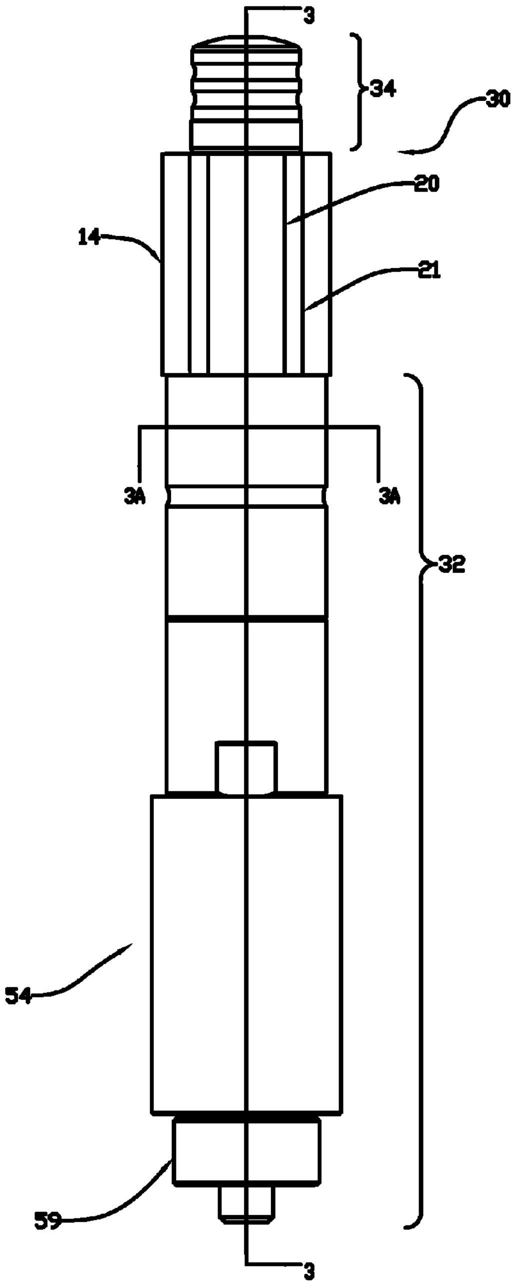
FIG. 2 is a side elevation showing a puller according to an example embodiment.

FIG. 2 shows a puller 30 according to an example embodiment. It can be seen that puller 30 has two parts, a main puller component 32 and a follower 34. Main puller component 32 is constructed so that it can be used to apply tension to a pin such as a pin 20. The pulling force developed by main puller component 32 may be used to pull a pin 20 (and in some cases an associated bushing 21) out of a bore in which the pin has been installed or to pull a new pin 20 (or a pin 20 and associated bushing 21) into a bore in which it is desired to install the pin and bushing. Follower 34 serves to prevent the pin 20 from being pulled out of the associated bushing 21 during removal. As described below in relation to FIG. 6 a similar follower 70 may also be used during installation of a pin and bushing.

Figure 3:
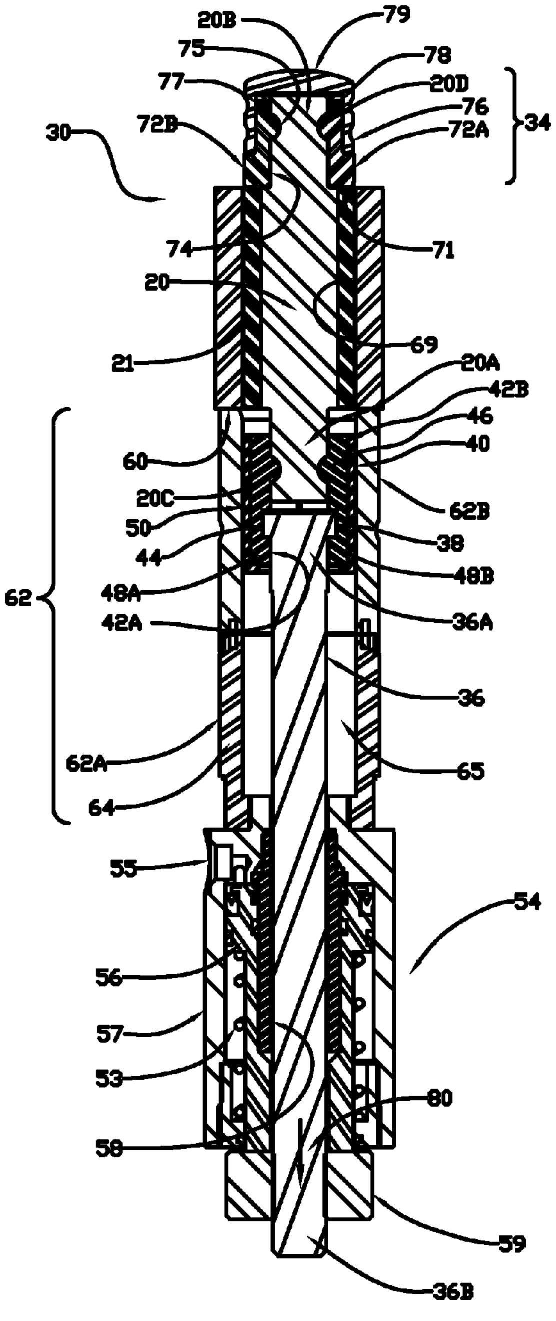
FIG. 3 is a longitudinal cross-section of the puller of FIG. 2.
Figure 3A:
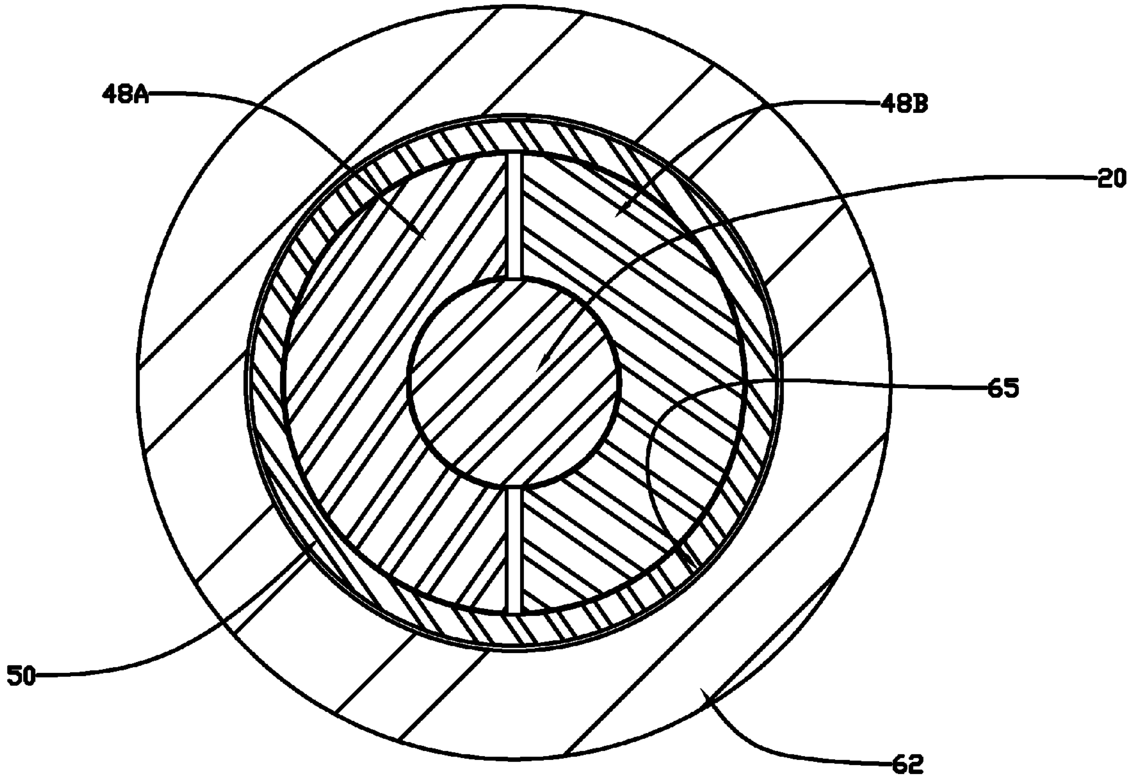
FIG. 3A is a cross-section on the line 3A-3A. Illustrating the construction of a mechanism for grasping the head of a pin to be pulled.

Details of an example embodiment of the tool are shown in FIGS. 2 and 3. Tool 30 includes a pull-rod 36 that can be coupled to one end 20A of the pin 20 by a coupler 40. Pull-rod 36 and coupler 40 include features that permit pull-rod 36 to engage coupler 40. In the illustrated embodiment, coupler 40 comprises shells 48A and 48B and a retaining sleeve 50. Alternative coupler constructions may be provided in other embodiments. In the embodiment illustrated in FIG. 3, pull-rod 36 includes a radially-extending flange 38. Coupler 40, when assembled, comprises a bore end 42A which receives the end 36A of pull-rod 36 and includes a circumferential groove 44 which receives flange 38.

Pin 20 comprises a projecting end portion 20A which includes a circumferential groove 20C. Coupler 40 defines a second bore end 42B which receives the projecting end 20A of pin 20. Coupler 40 includes an engagement feature that engages circumferential groove 20C. In the illustrated embodiment, the engagement feature comprises one or more projections on the wall of bore end 42B. When coupler 40 is assembled, the projections extend into groove 20C. In the illustrated embodiment, the projections comprise a ridge 46. Ridge 46 extends circumferentially and continuously all of the way around groove 20C in the illustrated embodiment.

In the illustrated embodiment, coupler 40 comprises two shells 48A and 48B that can be mated together to define bore ends 42A and 42B and the associated engagement features for pull-rod 36 and pin 20.

Coupler 40 may be attached to couple pin 20 to pull-rod 36 by placing the end of pull-rod 36 adjacent to the end of pin 20 and then placing shells 48A and 48B on either side of the pin and pull-rod such that pull-rod 36 is engaged in bore end 42A and end 20A of pin 20 is engaged in bore end 42B. A retaining sleeve 50 may be slid over shells 48A and 48B after they have been mated around pin 20 and pull-rod 36. Sleeve 50, when installed, prevents shells 48A and 48B from coming apart and thereby insures that pull-rod 36 will remain firmly coupled to the end of pin 20.

There are a number of alternative structures for coupler 40. For example, pull-rod 36 could have an alternative structuring on its end 36A. For example, pull-rod 36 could have a circumferential groove similar to the groove 20C provided on pin 20. In that case, coupler 40 could include one or more projections that engage such a groove. Different couplers 40 may be provided for engaging pins 20 having different dimensions or configurations and/or pins embedded in bushings having different diameters. One of shells 48A and 48B could be affixed to the end 36A of pull-rod 36 so that coupling of the pull-rod 36 to a pin 20 can be achieved by installing the other one of shells 48A and 48B and, when so configured, sliding a retaining sleeve 50 over the mated shells. Shells 48A and 48B may comprise magnets, projections, or other interacting features that facilitate releasably holding shells 48A and 48B together in their mated configuration. This facilitates coupling of pull-rod 36 to a pin 20.

Some embodiments may provide couplers that comprise one or more cross pins or one or more setscrews or the like that may be inserted to engage an end 20A of a pin 20 to be pulled on. In some such embodiments the coupler may remain affixed to the end of a pull rod. For example, such a coupler may comprise a collar having one end attached or attachable to the pull rod with the other end cross-drilled to accept a cross-pin or drilled and threaded to accept one or more set screws or the like. Where the pin to be pulled has a circumferential groove, the cross-pin(s) and/or set screws may engage in the groove to positively engage the end of the pin for pulling on the end of the pin.

Pull-rod 36 is coupled to a puller assembly 52 comprising an actuator 54. Actuator 57 is conveniently a hydraulic actuator, such as a hydraulic piston. Actuator 57 may, in the alternative, comprise a screw, a lever, or other puller mechanism. In the illustrated embodiment, actuator 57 comprises a hydraulic piston 56 that is sealingly and slidably mounted within a hydraulic cylinder 57. A port 55 can receive pressurized fluid from a pump (not shown) and deliver the pressurized fluid to a volume behind piston 56. In the illustrated embodiment, piston 56 and cylinder 57 are single-acting. Piston 56 may be extended by introducing pressurized fluid at port 55. When the pressure at port 55 is released, spring 53 pushes piston 56 back toward its original retracted position.

An opening 58 extends through piston 56. As shown in FIG. 3, opening 58 is large enough to receive pull-rod 36. A fastener such as nut 57 may then be attached to the distal end 36B of pull-rod 36. Puller assembly 52 comprises an abutment face 60 that is supported relative to actuator 57 by a spacer 62. Spacer 62 is configured to provide a space into which pin 20 and the associated bushing 21 can be pulled. In the illustrated embodiment, spacer 62 comprises first and second parts 62A and 62B. In this embodiment, at least part 62B is removable to allow adjustment of the overall length of spacer 62.

In the illustrated embodiment, spacer 62 comprises a tubular member 64. Tubular member 64 has a bore 65. Retaining sleeve 50 may be a sliding fit in bore 65. In some embodiments, bore 65 itself serves as a retaining sleeve for coupler 40.

Puller 30 may be used by first assembling pull-rod 36 to a pin 20 to be pulled using coupler 40. The pin 20 may, for example, be lodged in a bore 69 in some component. Then, puller assembly 52 comprising spacer 62 and actuator 57 may be slid over pull-rod 36 so that distal end 36B of pull-rod 36 projects from the distal end of puller 57 and abutment face 60 is supported against the component in which the pin 20 is mounted. Fastener 57 is then installed on the distal end of pull-rod 36 such that, upon operation of actuator 54, pull-rod 36 is placed under tension and pulls on pin 20. Depending upon the stroke of actuator 57 as compared to the length of pin 20, it may be necessary to operate actuator 57 through its stroke, return actuator 57 to the beginning of its stroke, tighten fastener 57 and to repeat this one or more times to fully withdraw pin 20 (and any associated bushing 21) from the bore 69 in which pin 20 is located.

FIG. 3 also shows a follower 34. In the illustrated embodiment, follower 34 comprises first and second shells 72A and 72B and may also comprise a follower retainer sleeve 76. When shells 72A and 72B are mated together, they define a bore 74 which can receive a second end 20B of pin 20. Shells 72A and 72B have engagement features that engage the end 20B of pin 20. In the illustrated embodiment, pin 20 has a circumferential groove 20D near its end 20B and shells 72A and 72B include projections 75 that engage in groove 20D. In some embodiments, projections 75 comprise a circumferential ridge which extends substantially continuously around groove 20D of pin 20.

A retainer sleeve 76 may be placed over shells 72A and 72B after they have been mated together around pin 20. In the illustrated embodiment, retainer sleeve 76 comprises a cup shaped assembly having an opening that receives at least end portions of shells 72A and 72B. When retainer sleeve 76 is in place, shells 72A and 72B cannot be separated from one another.

In the illustrated embodiment, retainer sleeve 76 has outer-dimensions that are slightly smaller than the largest outer-dimensions of follower 34. Follower 34 has an outer-dimension which is similar to but no greater than the outer-dimension of bushing 21. In the illustrated embodiment, outer faces of shells 72A and 72B define the outer dimension of follower 34. When follower 34 is attached on end 20B of pin 20 then follower 34 prevents pin 20 from being pulled out of bushing 21. Force for pulling bushing 21 is transmitted by pin 20 to follower 34. Follower 34 brings bushing 21 out along with pin 20. Follower 34 may have a flat front face 71 extending around the opening of bore 74. In the illustrated embodiment front face 71 has a circular periphery.

In the illustrated embodiment, retainer sleeve 76 is held in place over the mated shells 72A and 72B by a holding member. In the illustrated embodiment, the holding member comprises an O-ring 77 received in a circumferential groove 78 extending around the outer-diameter of shells 72A and 72B in their portions that are received within retainer sleeve 76. Various alternative mechanisms may be provided to hold shells 72A and 72B together an/or to hold retainer sleeve 76 in place on the mated shells 72A and 72B. For example, one or more magnets, pins engageable in corresponding recesses, springs or the like (or combinations thereof) may be provided to hold shells 72A and 72B mated together. One or more indent mechanisms, springs, magnets, set screws, friction pads, or the like may be provided to hold retainer sleeve 76 in place over mated shells 72A and 72B.

Follower 34 may be attached to end 20B of pin 20 by placing shells 72A and 72B on either side of pin 20 and bringing the shells together so that projections 75 engage in groove 20D. O-ring 77 may then be placed into groove 78, thus holding shells 72A and 72B together. Retainer sleeve 76 may then be slid over the exposed ends of shells 72A and 72B.

Frictional engagement between O-ring 77 and the inner wall of retainer sleeve 76 helps to hold the retainer sleeve in place.

The rear end of retainer sleeve 76 may comprise a striking face 79. In the illustrated embodiment, striking face 79 is somewhat domed. A user can assist in urging pin 21 out of its bore by applying impacts to striking face 79.

Figure 4:
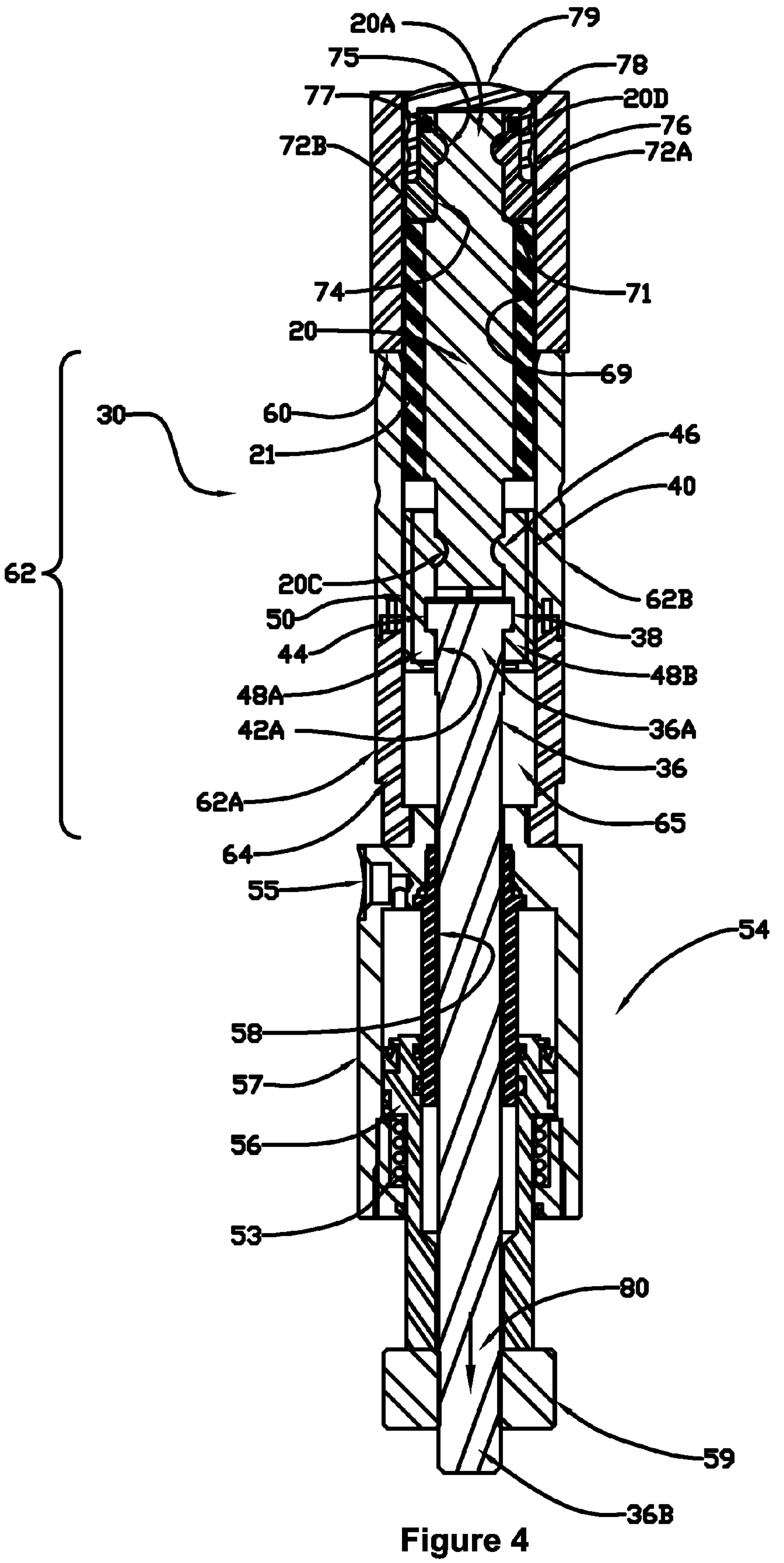
FIG. 4 is a cross-section of the puller of FIG. 2 part-way through the process of pulling a pin and bushing out from a bore.
Figure 5:
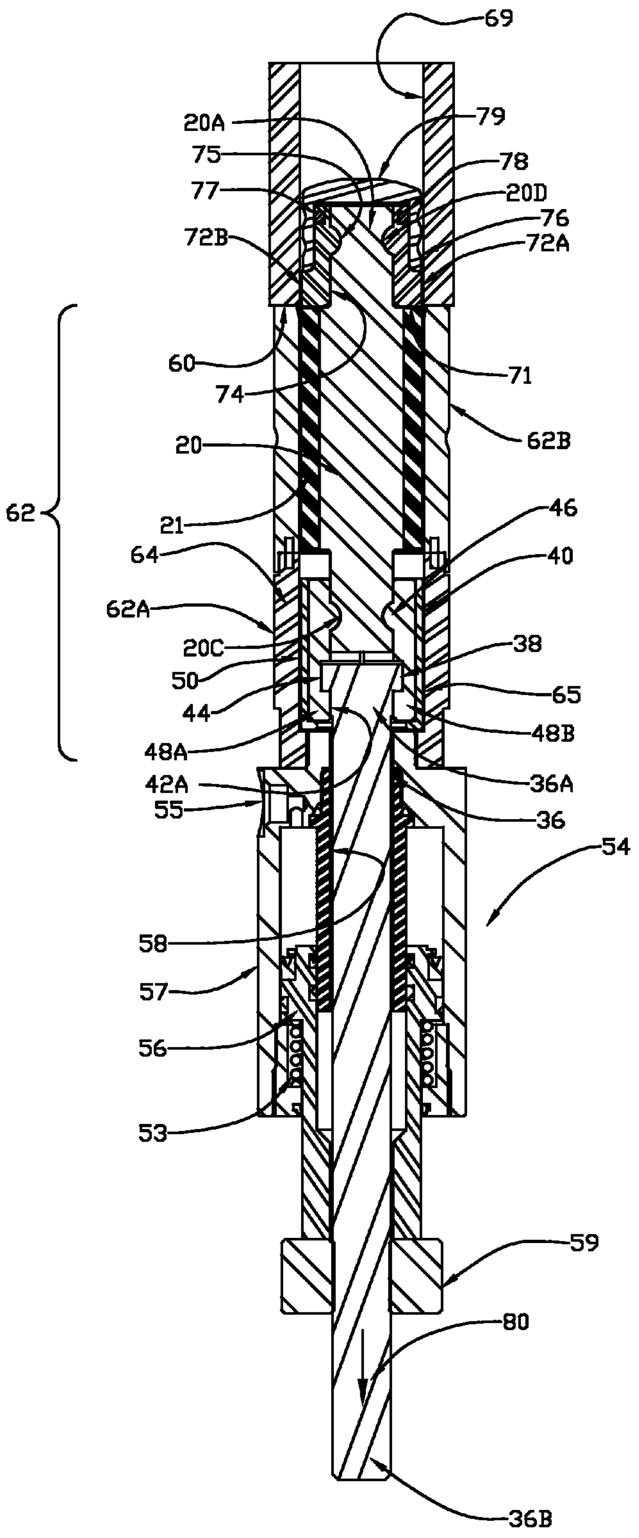
FIG. 5 is a cross-section of the puller of FIG. 2 showing the condition of the puller when the pin and bushing have been fully extracted from the bore.

FIGS. 3, 4 and 5 show a sequence of configurations of a puller 30 that is pulling out a pin 20 that is engaged in a bore for a distance that is longer than a stroke of the actuator 54. Initially pin 20 is fully engaged in the bore as shown in FIG. 3. From the configuration shown in FIG. 3, hydraulic fluid is pumped into cylinder 57 thereby pushing piston 56 in the direction indicated by arrow 80. When actuator 57 is at the end of its stroke, pin 20 still has a portion engaged in bore 69. Piston 56 is retracted (e.g. by depressurizing hydraulic fluid at port 55). In the illustrated embodiment, a spring 53 assists in returning piston 56 to its retracted configuration.

Once piston 56 has returned to its retracted configuration then fastener 57 can be tightened. Piston 56 may be extended once again by pumping fluid into cylinder 57 through port 55. In the illustrated embodiment, by the end of the second stroke of piston 56, pin 20 and its associated bushing 21 have been completely removed from bore 69.

It will be appreciated that the basic idea of transmitting force through a pin embedded in a bushing to a follower coupled to an end of the pin such that the follower pushes on the bushing as the pin is pulled may be practiced with followers of designs different from the embodiments described above. For example, a follower may comprise a collar that can be affixed in any suitable way to one end of a pin to be pulled. In the case that the pin is being pulled out and will be subsequently disposed of the follower may even comprise a disposable collar welded or otherwise bonded non to the pin. In other example embodiments the follower may comprise a collar that can be removably affixed to an end of a pin by way of set screws, cross-pins, a clamp, threads (if the end of the pin to be pulled is threaded) or the like.

Figure 6:
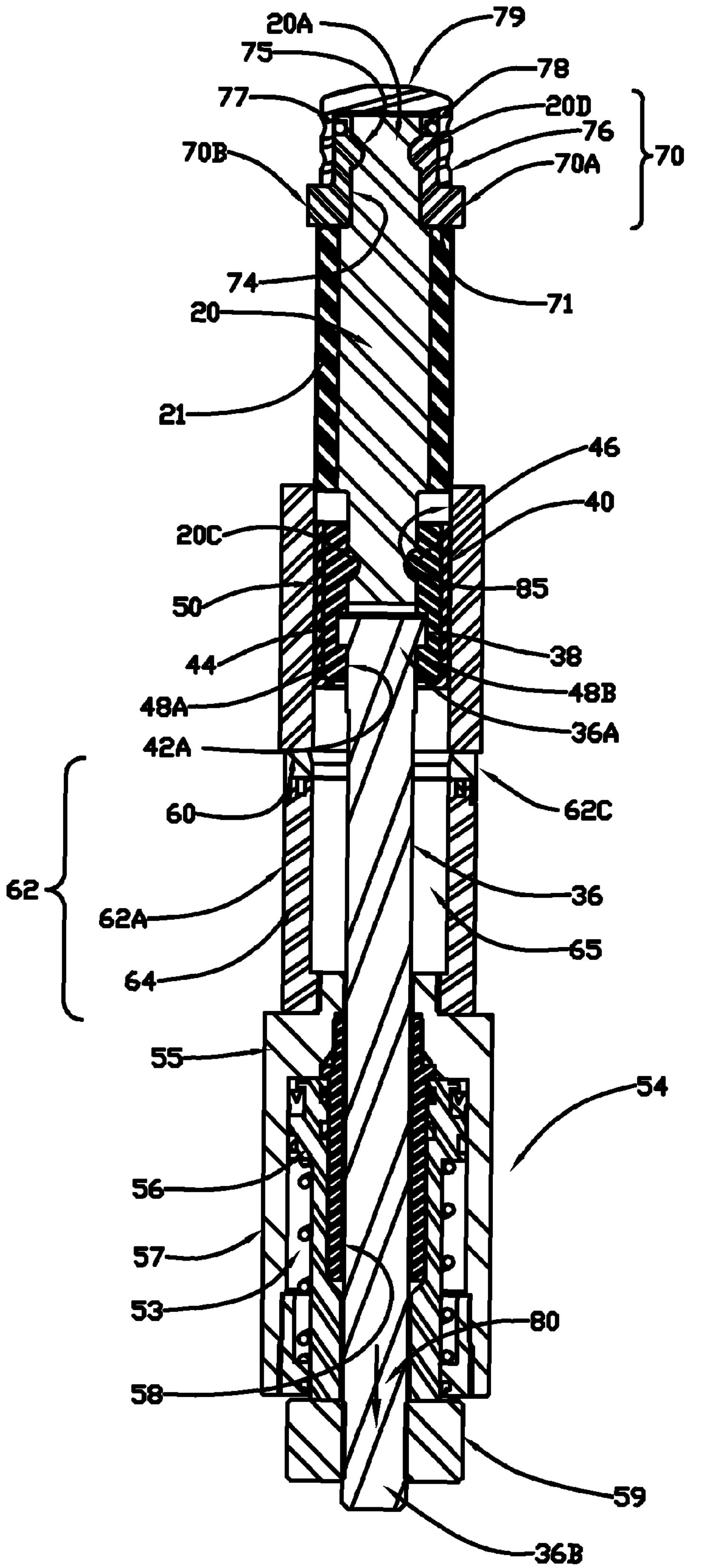
FIG. 6 shows a puller like that shown in FIG. 2 set up to draw a pin and bushing into a bore.

As mentioned above, tool 30 may also be used to pull a pin 20 and its associated bushing 21 into a chassis component. As shown in FIG. 6, this can be achieved by coupling pull-rod 36 to a new pin 20 to be inserted into a bore 85 using coupler 40 as described above. Pull-rod 36 is then passed through bore 85 and coupled to puller assembly 52. A follower 70 may be mounted to the opposite end of pin 20.

In some embodiments, spacer 62 is shortened thereby making it unnecessary to have a very long pull-rod 36. In the illustrated embodiment, spacer 62 comprises two parts 62A and 62B. Spacer 62 can be shortened by removing part 62B. In the illustrated embodiment, part 62B is replaced with a shorter part 62C that has an abutment face for engaging a part into which a pin is to be pulled.

With puller 30 connected as shown in FIG. 6, actuator 57 is operated to apply tension to pull-rod 36. This pulls pin 20 into bore 85. As mentioned above, it may be necessary to operate actuator 57 through a number of strokes, tightening fastener 57 each time, in order to draw a pin 20 fully into bore 85. Follower 70 helps to push bushing 21 into bore 85.

Figure 7:
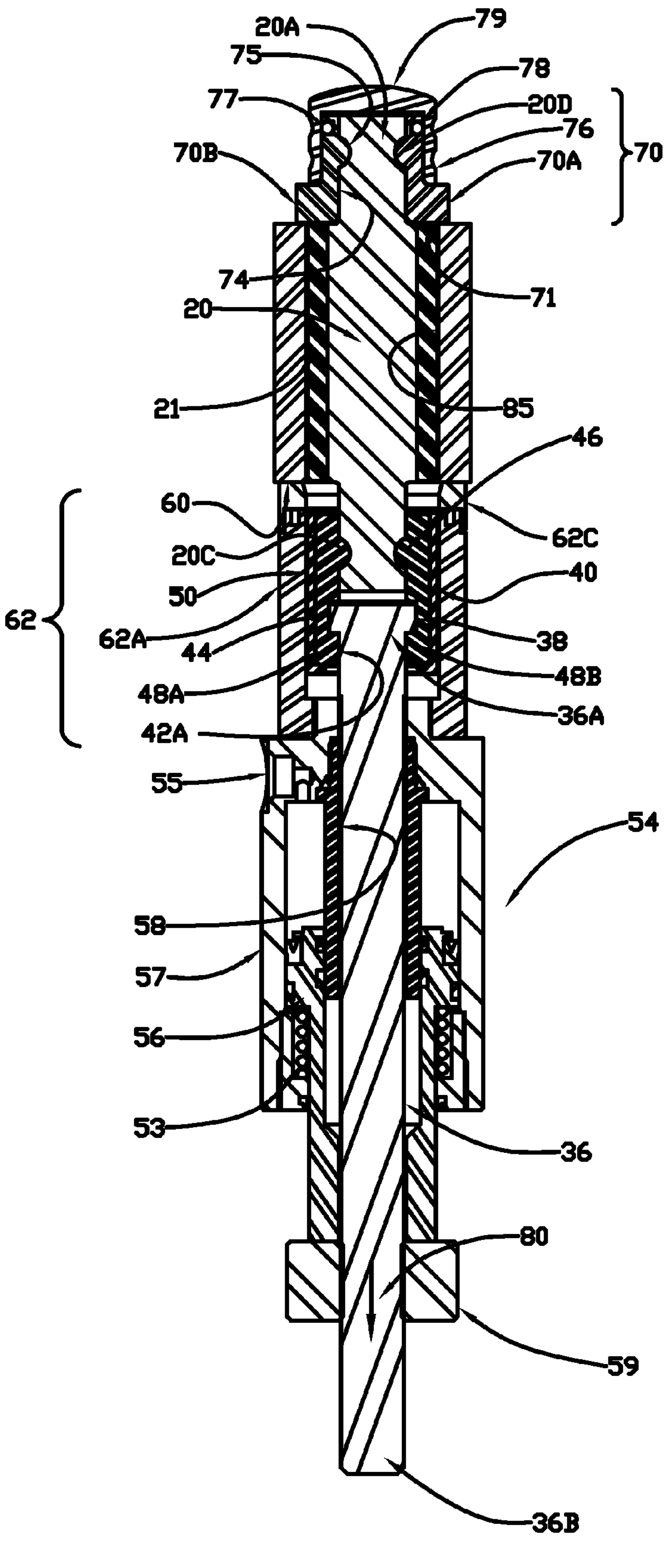
FIG. 7 shows the puller of FIG. 6 having just completed pulling the pin and bushing into the bore.

FIG. 7 shows the configuration of puller 30 at the conclusion of pulling pin 20 and its associated bushing 21 into bore 85. Coupler 40 has been pulled into the first part 62A of spacer 62. Follower 70 has stopped at the rear end of bore 85, thereby causing pin 20 and bushing 21 to be properly located.

In some embodiments, follower 70 has an outer-dimension greater than that of bore 85. In such embodiments, follower 70 provides a positive stop when pin 20 has been pulled properly into bore 85. The construction of follower 70 may be the same as or substantially similar to the follower 34 described above. A tool 30 may be supplied with both a follower 34 and a larger-diameter follower 70 both capable of coupling to a pin 20.

Figure 8:
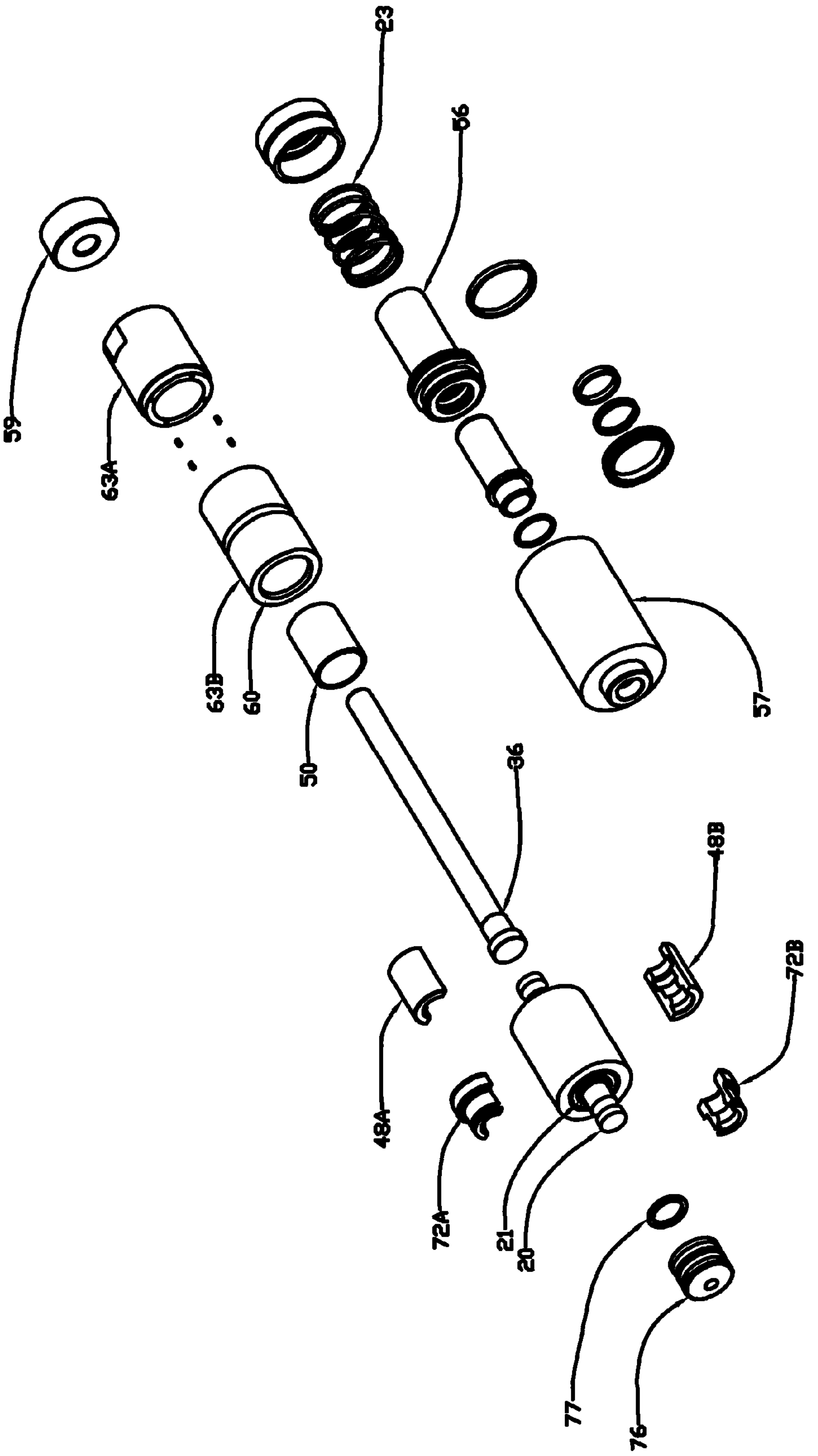
FIG. 8 is an exploded view of a tool of the type shown in FIG. 3.

FIG. 8 is an exploded view showing parts of a puller 30 according to an example embodiment together with a pin 20 embedded in a bushing 21.

In a method according to an example embodiment a pin and bushing are pulled into or out of a bore. A follower is attached to one end of the pin and tension is applied to the other end of the pin. The pin itself acts to transmit force to the follower. Pulled along by the pin, the follower pushes on the bushing from behind In some embodiments the follower projects past the bushing and provides a positive stop to travel of the pin when the bushing has been pulled fully into a bore. The follower may have a construction as described above but this is not mandatory. The follower may have another construction that permits it to be firmly clamped to an end of the pin. For example, the follower may comprise a ring having one or more setscrews, clamps, or the like which permit the ring to be removably locked onto an end of the pin.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A pin puller tool comprising:

a pull rod;

a coupler for coupling a first end of the pull rod to a first end of a pin to be pulled a puller comprising an actuator configured to apply longitudinal pulling force on the pull rod; and a follower configured for coupling to a second end of the pin to be pulled, the follower having a face for bearing against a bushing in which the pin to be pulled is embedded wherein the follower comprises a first pair of mating shells, the shells, when mated, defining a bore for receiving the second end of the pin the bore comprising an engagement feature configured to engage the second end of the pin.

2. A tool according to claim 1 wherein the follower comprises a follower retainer sleeve slidably engageable over the shells, when mated, the follower retainer sleeve, when engaged over the mated shells, preventing the shells from becoming disengaged from the second end of the pin.

3. A tool according to claim 2 wherein the follower retainer sleeve comprises a striking surface on an end thereof.

4. A tool according to claim 2 wherein the follower retainer sleeve is cup-shaped.

5. A tool according to claim 2 wherein the follower retainer sleeve comprises a holding member operative to hold the follower retainer sleeve in place over the mated shells.

6. A tool according to claim 5 wherein the holding member comprises an O-ring disposed in a groove within the bore of the follower retainer sleeve.

7. A tool according to claim 2 wherein the follower has a cylindrical outer surface.

8. A tool according to claim 2 wherein the engagement feature comprises a circumferentially-extending ridge configured to engage a circumferential groove in the second end of the pin.

9. A pin puller tool comprising:

a pull rod;

a coupler for coupling a first end of the pull rod to a first end of a pin to be pulled a puller comprising an actuator configured to apply longitudinal pulling force on the pull rod; and a follower configured for coupling to a second end of the pin to be pulled, the follower having a face for bearing against a bushing in which the pin to be pulled is embedded wherein the coupler comprises a pair of second mating shells, the second mating shells, when mated, defining opposing first and second bore ends, the first bore end comprising a rod engagement feature configured to engage an end of the pull rod, the second bore end comprising a pin engagement feature configured to engage the first end of the pin.

10. A tool according to claim 9 comprising a sleeve, the sleeve slidably engageable over the second shells when mated, the sleeve, when engaged over the mated second shells, preventing the second shells from becoming disengaged.

11. A tool according to claim 9 wherein the pin engagement feature comprises an engagement projection projecting radially inwardly from a wall of the second bore end.

12. A tool according to claim 11 wherein the engagement projection comprises a circumferentially-extending ridge configured to engage a circumferential groove in the first end of the pin.

13. A pin puller tool comprising:

a pull rod;

a coupler for coupling a first end of the pull rod to a first end of a pin to be pulled a puller comprising an actuator configured to apply longitudinal pulling force on the pull rod; and a follower configured for coupling to a second end of the pin to be pulled, the follower having a face for bearing against a bushing in which the pin to be pulled is embedded wherein the puller comprises a puller bore dimensioned to receive a second end of the pull rod and the tool comprises a fastener connectable at the second end of the pull rod.

14. A tool according to claim 13 wherein the actuator comprises a hydraulic piston and the puller bore extends through the hydraulic piston.

15. A pin puller tool comprising:

a pull rod;

a coupler for coupling a first end of the pull rod to a first end of a pin to be pulled a puller comprising an actuator configured to apply longitudinal pulling force on the pull rod; and a follower configured for coupling to a second end of the pin to be pulled, the follower having a face for bearing against a bushing in which the pin to be pulled is embedded wherein the puller comprises a spacer extending between an abutment surface and the actuator.

16. A tool according to claim 15 wherein the spacer comprises a longitudinal bore and the bore of the spacer is tapered at its end toward the abutment surface.

17. A tool according to claim 15 wherein the spacer is adjustable in length.

18. A tool according to claim 17 wherein the spacer comprises a tubular member and the length of the spacer is adjustable by installing or removing the tubular member.

19. A pin puller tool comprising:

a pull rod;

a coupler for coupling a first end of the pull rod to a first end of a pin, the coupler comprising first and second mating shells, the first and second shells, when mated, defining opposing first and second bore ends, the first bore end comprising a first engagement feature configured to engage an end of the pull rod, the second bore end comprising a second engagement feature configured to engage the one end of the pin;

a sleeve slidably engageable over the first and second mating shells, when mated, the sleeve, when engaged over the mated first and second shells, preventing the first and second shells from becoming disengaged;

a puller comprising an actuator configured to apply longitudinal pulling force on the pull rod.

20. A tool according to claim 19 wherein the first end of the pull rod comprises a radially-projecting flange and the first engagement feature comprises a circumferential groove in a wall of the first bore end, the circumferential groove configured to receive the flange.

21. A tool according to claim 19 wherein the second engagement feature comprises an engagement projection projecting radially inwardly from a wall of the second bore end.

22. A tool according to claim 21 wherein the engagement projection comprises a circumferentially-extending ridge configured to engage a circumferential groove in the first end of the pin.

23. A tool according to claim 19 wherein the puller comprises a puller bore dimensioned to receive a second end of the pull rod and the tool comprises a fastener connectable at the second end of the pull rod.

24. A tool according to claim 23 wherein the actuator comprises a hydraulic piston and the puller bore extends through the hydraulic piston.

25. A tool according to claim 19 wherein the puller comprises a spacer extending between an abutment surface and the actuator.

26. A tool according to claim 25 wherein the spacer comprises a longitudinal bore and the bore of the spacer is tapered at its end toward the abutment surface.

27. A tool according to claim 25 wherein the spacer comprises a longitudinal bore and the sleeve is a sliding fit in the bore of the spacer.

28. A tool according to claim 25 wherein the spacer is adjustable in length.

29. A tool according to claim 28 wherein the spacer comprises a tubular member and the length of the spacer is adjustable by installing or removing the tubular member.

30. A tool according to claim 19 wherein the actuator comprises a screw.

31. A tool according to claim 19 comprising a follower configured for attachment to a second end of the pin, the follower comprising:

third and fourth mating shells, the third and fourth shells, when mated, defining a bore for receiving the second end of the pin the bore comprising a third engagement feature configured to engage the second end of the pin; and a follower retainer sleeve slidably engageable over the third and fourth mating shells, when mated, the follower retainer sleeve, when engaged over the mated third and fourth shells, preventing the third and fourth shells from becoming disengaged.

32. A tool according to claim 31 wherein the follower retainer sleeve comprises a striking surface on an end thereof.

33. A tool according to claim 31 wherein the follower retainer sleeve is cup-shaped.

34. A tool according to claim 31 wherein the follower retainer sleeve comprises a holding member operative to hold the follower retainer sleeve in place over the mated third and fourth shells.

35. A tool according to claim 34 wherein the holding member comprises an O-ring disposed in a groove within the bore of the follower retainer sleeve.

36. A tool according to claim 31 wherein the follower has a cylindrical outer surface.

37. A tool according to claim 31 wherein the third engagement feature comprises a circumferentially-extending ridge configured to engage a circumferential groove in the second end of the pin.

* * * * *

UNITED STATES PATENT AND TRADEMARK OFFICE

CERTIFICATE OF CORRECTION

PATENT NO. : 8,627,557 B2
APPLICATION NO. : 12/830409
DATED : January 14, 2014
INVENTOR(S) : Jansen et al.

It is certified that error appears in the above-identified patent and that said Letters Patent is hereby corrected as shown below:

In the Specification

Col. 5, ln. 37, delete “Actuator 57 is conveniently” and insert --Actuator 54 is conveniently--.
Col. 5, ln. 38, delete “Actuator 57” and insert --Actuator 54--.
Col. 5, ln. 40, delete “actuator 57” and insert --actuator 54--.
Col. 5, ln. 51, delete “nut 57” and insert --nut 59--.
Col. 5, ln. 53, delete “actuator 57” and insert --actuator 54--.
Col. 6, ln. 1, delete “actuator 57” and insert --actuator 54--.
Col. 6, ln. 3, delete “puller 57” and insert --puller 54--.
Col. 6, ln. 5, delete “Fastener 57” and insert --Fastener 59--.
Col. 6, ln. 8, delete “actuator 57” and insert --actuator 54--.
Col. 6, ln. 9, delete “actuator 57” and insert --actuator 54--.
Col. 6, ln. 10, delete “actuator 57” and insert --actuator 54--.
Col. 6, ln. 11, delete “fastener 57” and insert --fastener 59--.
Col. 7, ln. 13, delete “actuator 57” and insert --actuator 54--.
Col. 7, ln. 19, delete “fastener 57” and insert --fastener 59--.
Col. 7, ln. 52, delete “actuator 57” and insert --actuator 54--.
Col. 7, ln. 55, delete “actuator 57” and insert --actuator 54--.
Col. 7, ln. 55, delete “fastener 57” and insert --fastener 59--.
Col. 8, ln. 12, delete “from behind In some” and insert --from behind. In some--.

Signed and Sealed this
Twentieth Day of May, 2014

Michelle K. Lee

Michelle K. Lee
*Deputy Director of the United States Patent and Trademark Office*